(12) United States Patent
Bunya et al.

(10) Patent No.: US 7,044,489 B2
(45) Date of Patent: May 16, 2006

(54) STEERING DAMPER SYSTEM

(75) Inventors: Osamu Bunya, Saitama (JP); Takehiko Nanri, Saitama (JP); Kanji Hayashi, Saitama (JP); Takeshi Wakabayashi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 676 days.

(21) Appl. No.: 10/323,790

(22) Filed: Dec. 20, 2002

(65) Prior Publication Data

US 2003/0146594 A1    Aug. 7, 2003

(30) Foreign Application Priority Data

Dec. 28, 2001 (JP) .............................. 2001-400765

(51) Int. Cl.
*F16F 9/14* (2006.01)

(52) U.S. Cl. ....................................... 280/272; 180/219

(58) Field of Classification Search ................ 280/272, 280/270, 279, 90, 89; 188/306, 307, 308; 180/219, 218; 74/551.1, 551.2, 551.8
See application file for complete search history.

(56) References Cited

U.S. PATENT DOCUMENTS

| | | | |
|---|---|---|---|
| 6,401,884 B1 * | 6/2002 | Norman et al. ............ | 188/310 |
| 6,705,631 B1 * | 3/2004 | Hasegawa et al. .......... | 280/272 |
| 6,742,794 B1 * | 6/2004 | Bunya et al. ................ | 280/272 |
| 6,769,707 B1 * | 8/2004 | Hasegawa et al. .......... | 280/272 |
| 6,802,519 B1 * | 10/2004 | Morgan et al. ............. | 280/272 |
| 6,817,265 B1 * | 11/2004 | Hasegawa et al. ......... | 74/551.1 |

FOREIGN PATENT DOCUMENTS

| JP | 63-64888 A | 3/1988 |
|---|---|---|
| JP | 7-74023 B2 | 8/1995 |
| JP | 2593461 B2 | 12/1996 |

* cited by examiner

*Primary Examiner*—Tony Winner
(74) *Attorney, Agent, or Firm*—Birch, Stewart, Kolasch & Birch, LLP

(57) ABSTRACT

To make steerability more satisfactory in conformity with actual operation, by correcting the regulation of a damping force based on a variable quantity which has a close relationship with the magnitude of kick-back and with which the steering conditions at the time of actual operation can be grasped appropriately, in contrast to the system in which the regulation of the damping force is controlled linearly in proportion to a variable quantity related to the magnitude of kick-back. In a steering damper system of the liquid pressure type in which a damping force is exerted on a front wheel steering system provided at a front portion of a vehicle body and which comprises a control valve for making the damping force variable, the damping force is controlled based on the steering speed.

20 Claims, 8 Drawing Sheets

STEERING DAMPER SYSTEM

CROSS-REFERENCE TO RELATED APPLICATIONS

The present nonprovisional application claims priority under 35 USC 119 to Japanese Patent Application No. 2001-400765 filed on Dec. 28, 2001 the entire contents thereof is hereby incorporated by reference.

BACKGROUND OF THE INVENTION

1. Field of the Invention

The present invention relates to a liquid pressure type steering damper system for vehicles which is preferable for saddle ride type vehicles such as motorcycles and the like and is used for restraining the swing of a handle during operation.

2. Description of Background Art

In order to prevent the handle from being swung due to a kick-back upon a disturbance, liquid pressure type steering damper systems which generate a damping force against the swing have been known, for example, as disclosed in Japanese Patent No. 2593461. In addition, systems in which the damping force is variable so that the damping force is generated only when required and a needless damping force is not generated in other situations have also been known; for example, a system which controls the damping force based on steering angle and operating velocity as disclosed in Japanese Patent Laid-open No. Sho 63-64888. In addition, a system which controls the damping force based on variations in the load on the front wheel is disclosed in Japanese Patent Publication No. Hei 7-74023.

Further, the regulation of the damping force in the above-mentioned related art examples is only to generate the damping force correspondingly to the magnitude of the kick-back forecasted to be generated. It is considered that the generation of the damping force is controlled so as to be linear in proportion to a variable quantity (corresponding to steering angle, operating velocity and load on the front wheel, in the above-mentioned related art examples) related to the magnitude of the kick-back. However, there are some cases where in order to make steerability more satisfactory in conformity with the actual operation, it is desirable to correct the damping force which varies linearly (hereinafter this damping force will be referred to as reference value), according to the magnitude of the kick-back forecasted. Moreover, such a correction must be based on a variable quantity which has a close relationship with the magnitude of the kick-back forecasted and with which the steering conditions at the time of actual running can be grasped appropriately. Accordingly, it is an object of the present invention to realize the above-mentioned requests.

SUMMARY AND OBJECTS OF THE INVENTION

In order to solve the above-mentioned problems, the present invention pertains to a steering damper system of the liquid pressure type in which a damping force is exerted on a front wheel steering system provided at a front portion of a vehicle body and which includes a control valve for making the damping force variable. The damping force is varied according to a variable quantity related to the magnitude of a kick-back forecasted in the front wheel steering system with a reference value of the damping force varying linearly in proportion to the variable quantity that is corrected according to the steering speed of the front wheel steering system.

The present invention provides a variable quantity as the steering speed wherein a correction is conducted so that the correction amount becomes negative in relation to the reference value when the steering speed is low, and a correction is conducted so that the correction amount becomes positive in relation to the reference value when the steering speed is high.

The present invention provides a damping force that becomes constant when the steering speed has exceeded a predetermined threshold value.

According to the present invention, a reference value of the damping force is determined according to the variable quantity related to the magnitude of the kick-back forecasted, and the reference value is corrected according to the magnitude of the steering speed which has a close relationship with the generation of a kick-back wherein the steering conditions of the front wheel steering system can be grasped appropriately. Therefore, it is possible to generate an appropriate damping force according to the variation of the steering speed in actual operation, and to make the steerability more satisfactory in conformity with the actual operation.

According to the present invention, the variable quantity related to the magnitude of the kick-back is made to be the steering speed, whereby a damping force is generated according to the steering speed of the front wheel steering system. Therefore, it is possible to appropriately predict the magnitude of the kick-back to be generated, thereby generating a damping force with an appropriate magnitude and inhibiting the kick-back speedily and securely.

In addition, since the correction amount is made to be negative so as to make the generation of the damping force smaller than the reference value when the steering speed is low, priority can be given to light handle operability by the rider. On the contrary, when the steering speed is high, the correction amount is made to be positive so as to make the generation of the damping force greater than the reference value, whereby it is possible to increase the damping force and to inhibit the kick-back speedily and securely.

According to the present invention, the damping force becomes constant when the steering speed has exceeded a predetermined threshold value, and, from then on, the damping force is maintained to be constant even if the steering speed increases further. Therefore, generation of an excessively great damping force can be inhibited, and it is unnecessary to set a needlessly high strength for the steering damper.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
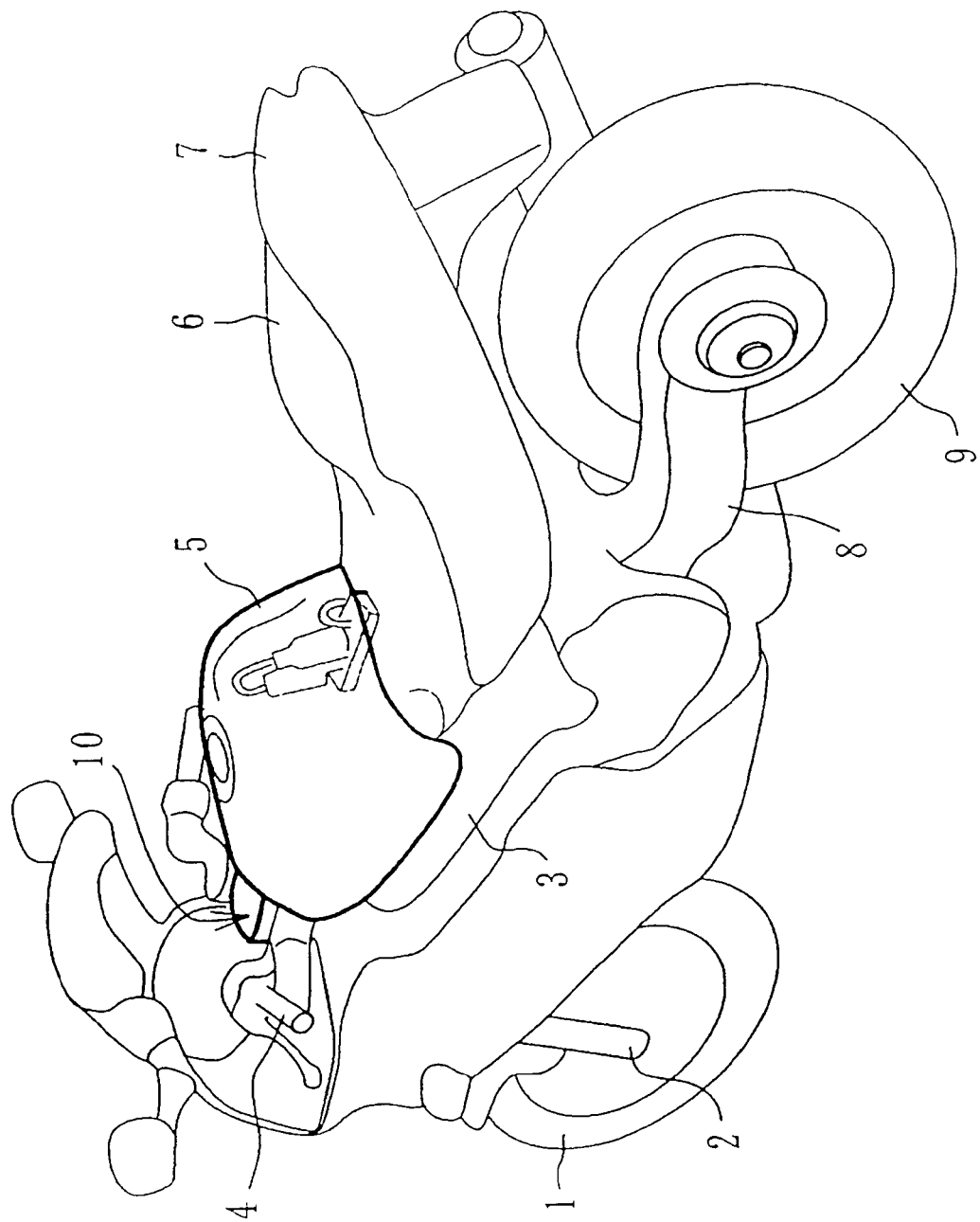
FIG. 1 is a perspective view showing a motorcycle to which the present embodiment is applied.

A first embodiment will be described based on the drawings. In FIG. 1, an upper portion of a front fork 2 for supporting a front wheel 1 at the lower end thereof is connected to a front portion of a vehicle body frame 3, and is turnable by a handle 4. A fuel tank 5 is supported on the vehicle body frame 3. A seat 6 is provided together with a rear cowl 7, a rear swing arm 8, and a rear wheel 9.

Figure 2:
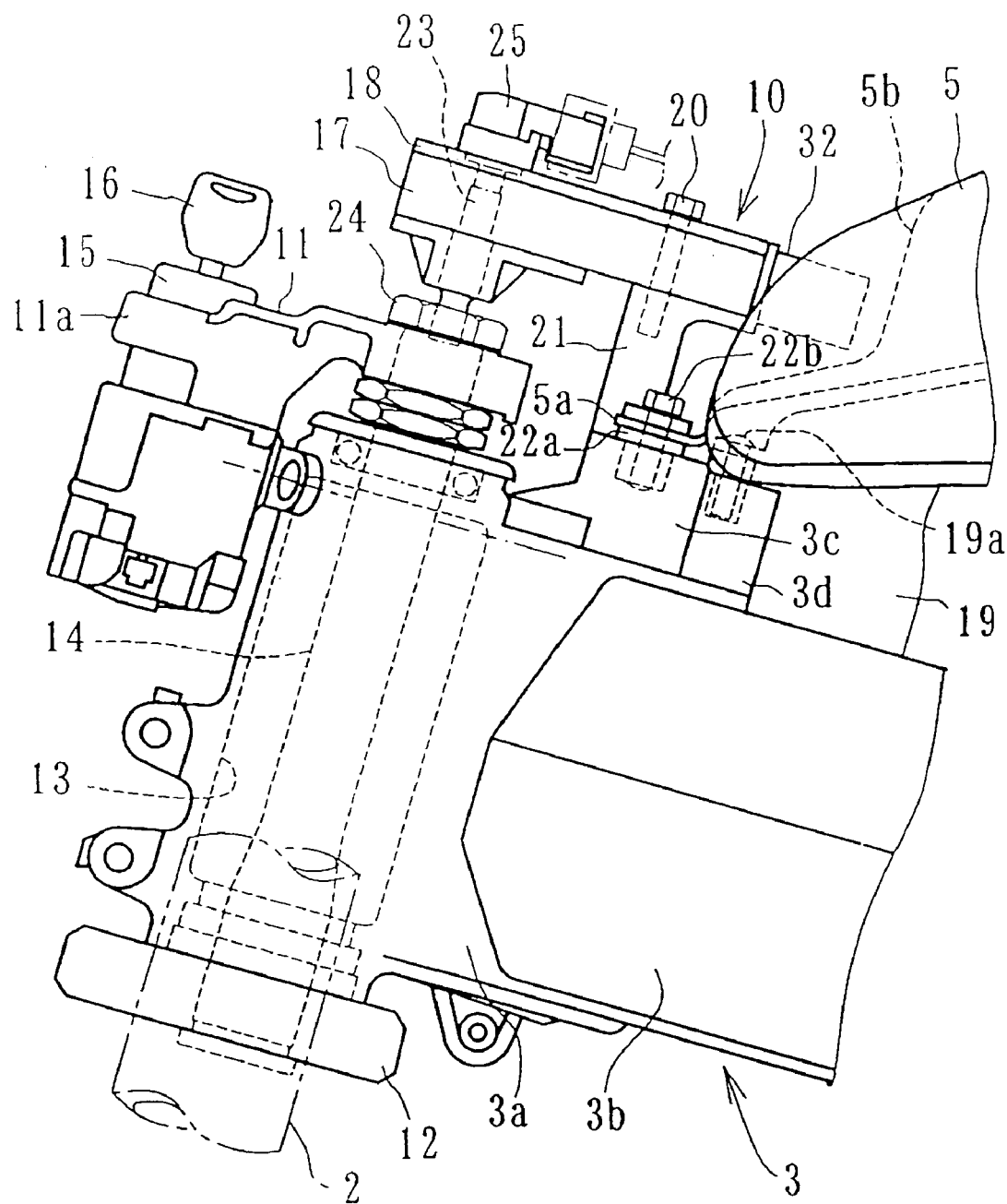
FIG. 2 is a side view of the structure of a front portion of a vehicle body at which a steering damper is provided.
Figure 3:
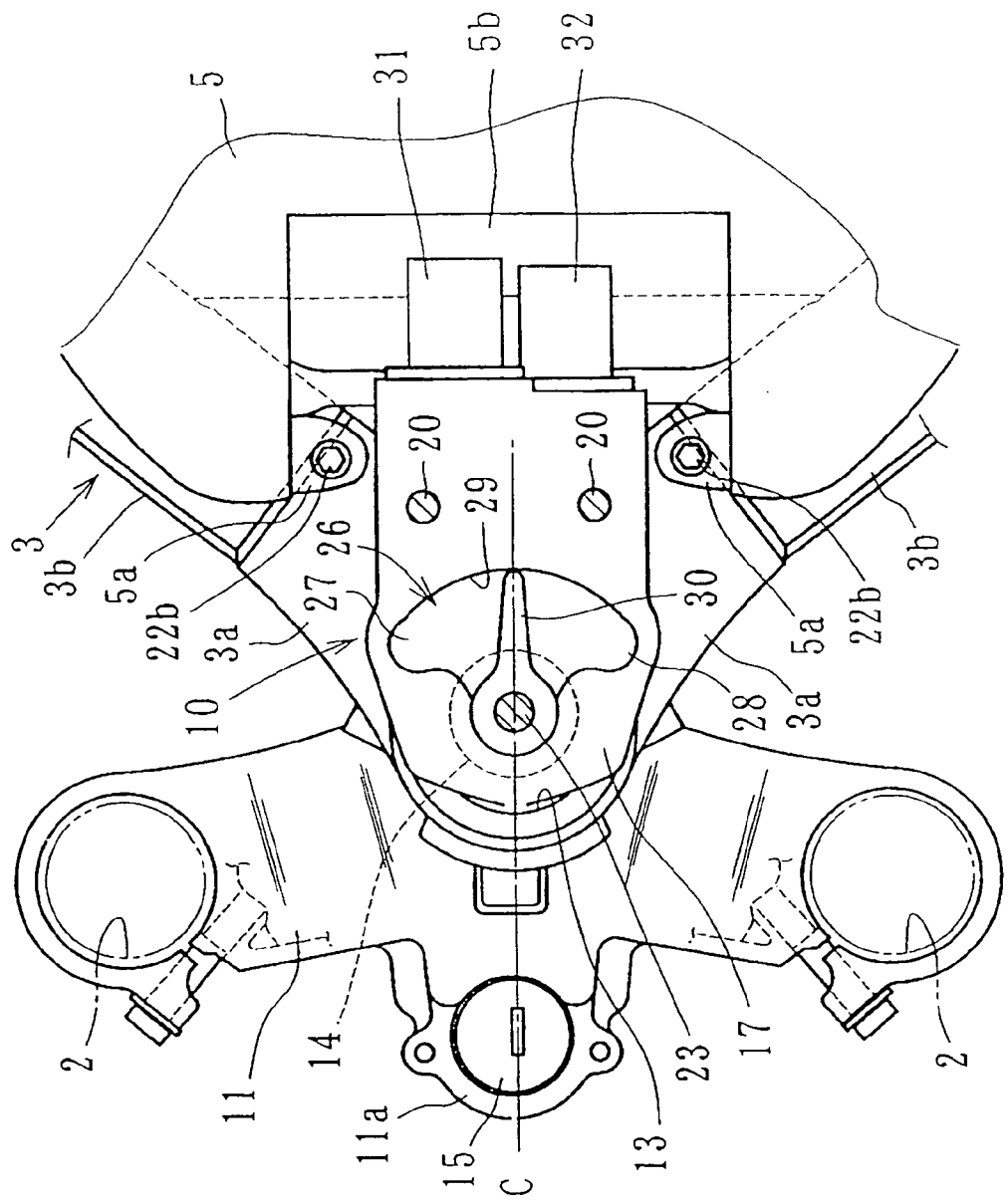
FIG. 3 is a plan view of the same.

As shown in FIGS. 2 and 3, the steering damper 10 is disposed on the upper side of a top bridge 11 to which the handle 4 is fitted. The top bridge 11 is shaftsupported on a head portion 3a which is a front end portion of the vehicle body frame 3. The top bridge 11 constitutes a pair with a bottom bridge 12 provided on the lower side, so as to integrally clamp a steering shaft 14, which is supported by a head pipe 13, from the upper and lower sides. The top bridge 11, the bottom bridge 12 and the steering shaft 14 are turned as one body.

The head pipe 13 in the present embodiment is a cylindrical portion integrally formed in the vertical direction at the center of a front portion of the head portion 3a. It should be noted that the head pipe 13 may be a known one which is preliminarily formed of a pipe member separate from the vehicle body frame and is unified with the front end portion of the vehicle body frame by welding or the like. The steering damper 10 is arranged to be elongate in the front-rear direction on the upper side of the head portion 3a, ranging from the upper side to the rear side of the head pipe 13 along the center C (FIG. 3) of the vehicle body.

Respective upper portions of a left-right pair of portions of the front fork 2 are supported on the top bridge 11 and the bottom bridge 12. The head pipe 13 is a pipe-like portion formed integrally with the head portion 3a of the vehicle body frame 3. The vehicle body frame 3 comprises the head portion 3a and main frame portions 3b extending in a pair from the left and right of a rear end portion of the head portion 3a to the left and right rear sides (FIG. 3). A stay 11a projecting integrally in a forward direction is provided at the center of a front portion of the top bridge 11. A main switch 15, integral with a handle lock, is supported on the stay 11a, and operations such as turning ON/OFF and unlocking are conducted through a key 16.

The steering damper system 10 in the present embodiment is a liquid pressure type damper for preventing kick-back, and comprises a main body portion 17 and a cover 18 (FIG. 2). The rear portion side of the steering damper 10 is fastened by a bolt 20 to a boss 21 formed integrally with and projecting upwardly from a top surface of the head portion 3a of the vehicle body frame 3 in the vicinity of the head pipe 13. At this time, the main body portion 17 and the cover 18 are co-fastened integrally. The boss 21 is preliminarily provided with a nut portion.

Raised stepped portions 3c are provided on the top surface of rear portions of the head portion 3a on the left and right sides of the boss 21 with stays 5a formed at the left and right sides of a front portion of the fuel tank 5 being fitted there with bolts 22b in a vibration-proof manner through rubber gaskets 22a. As shown in FIG. 3, the stays 5a project to the vehicle body center side from both sides of a front end portion of a recessed portion 5b provided at the center of a front portion of the fuel tank 5 in the state of being opened forwardly and upwardly and are overlapped onto the stepped portions 3c in the vicinity of the portions where the front end portions of the main frame portions 3b are connected.

Again in FIG. 2, an air cleaner 19 is disposed on the lower side of the fuel tank 5, and a front end portion thereof is fitted to a fitting portion 3d at the rear end of the head portion 3a by a bolt 19a, at a position on the lower side of the recessed portion 5b. The fitting portion 3d is a portion which is continually projected from the stepped portions 3c to the rear side and to the lower side of the recessed portion 5b.

A shaft 23 pierces through a front portion of the steering damper 10 with its axis directed vertically in FIG. 2 and is supported so as to be turnable with respect to the steering damper 10. The lower end of the shaft 23 projects downwardly from the main body portion 18 of the steering damper 10, is fitted to the upper end of the steering shaft 14, and is connected so as to be rotatable as one body. The shaft 23 and the steering shaft 14 are disposed coaxially.

A steering nut 24 is provided which fastens the upper end of the steering shaft 14 to the top bridge 11. The lower end of the shaft 23 pierces through a hole formed at a central portion of the steering nut 24.

The upper portion side of the shaft 23 pierces upwardly through the cover 18, and its upper end portion enters into a rotational angle sensor 25 fixed onto the cover 18. The rotational angle sensor 25 is a known one that uses electrical resistance or the like for detecting a rotational angle relative to the turning of the shaft 23 and the side of the main body 17 of the steering damper 10, thereby detecting a rotational angle of the steering shaft 14 rotated as one body with the shaft 23, and for outputting the detection signal to a control unit (described later) as sensor quantity for calculating the steering speed.

The steering damper 10 in FIG. 3 shows the structure on the side of the main body portion 17 exclusive of the cover 18. A roughly fan-shaped liquid chamber 26 is formed by a recessed portion provided in the main body portion 17, and the interior of the liquid chamber is partitioned into a right liquid chamber 27 and a left liquid chamber 28. A vane 30 is provided for forming a partition wall partitioning the left and right liquid chambers from each other with one end thereof being integrated with the shaft 23 for turning as one body with the shaft 23. A control valve 31 is provided together with a control unit 32. The control valve 31 and the control unit 32 are provided to project outwardly at a rear end portion of the steering damper 10, and are contained in the recessed portion 5b of the fuel tank 5 together with a rear end portion of the steering damper 10.

A steering lock 15 and the steering shaft 14 and the shaft 23 are located roughly on the same straight line with respect to the center line C of the vehicle body, the steering lock 15 and the control valve 31 and the control unit 32 are located on the opposite sides in the front-rear direction with respect to the steering damper 10. The control valve 31 and the control unit 32 are located on the left and right sides with respect to the center line C of the vehicle body with the control valve 31 and the control unit 32 being fitted to rear portions of the main body portion 17.

Figure 4:
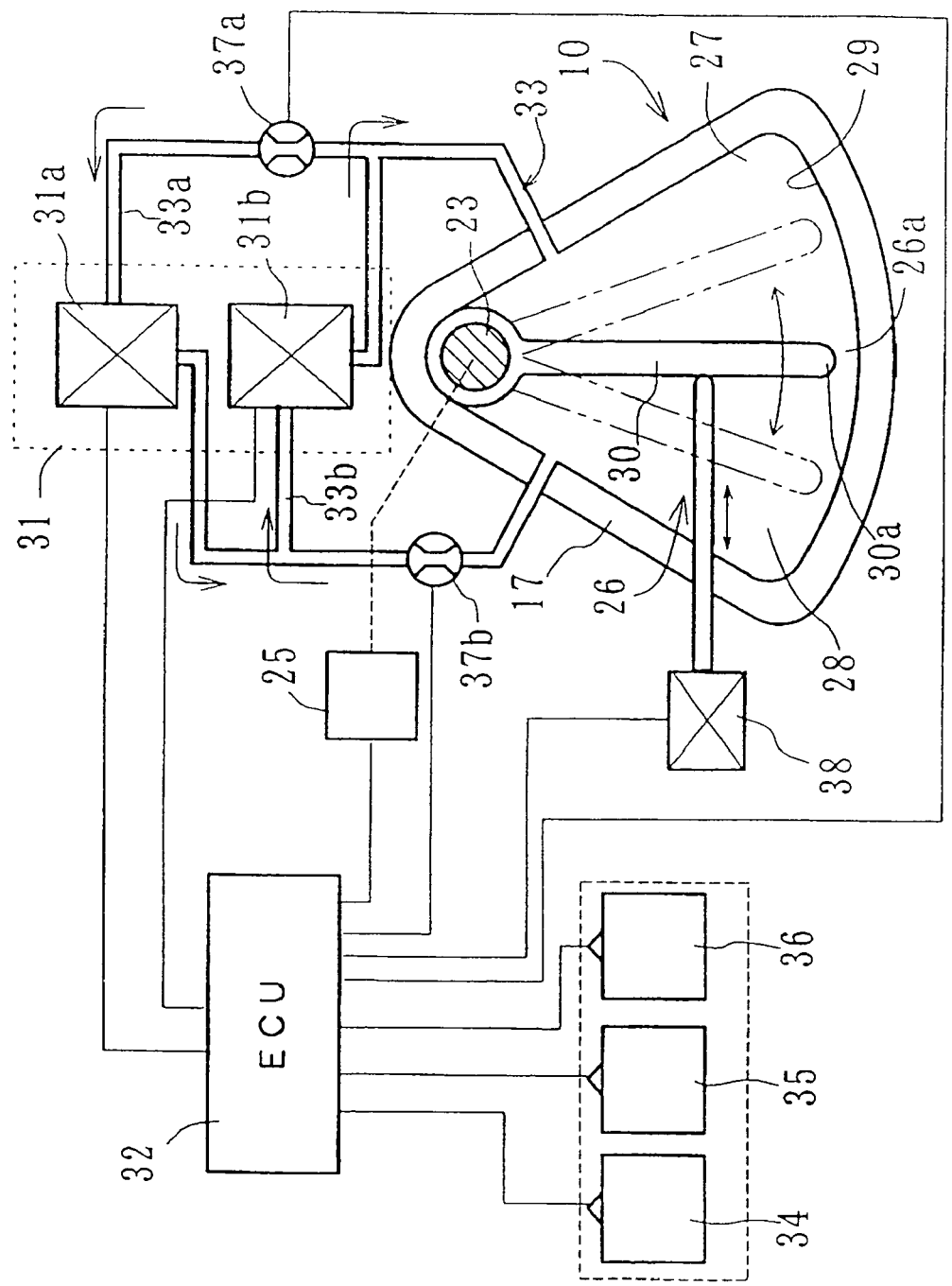
FIG. 4 is an illustration of general structure of the steering damper.

FIG. 4 schematically shows the structure of the steering damper 10, in which the interior of the steering damper 10 is provided with the fan-shaped liquid chamber 26 broadened to the rear side of the vehicle body (downwardly in the FIG. 4). The shaft 23 is located at a position corresponding to the pivot of the fan with the inside of the liquid chamber 26 being divided into the right liquid chamber 27 and the left liquid chamber 28 by the partition wall 30 extending rearwardly in a vane form integrally from the shaft 23. The steering damper 10 is of a vane type in which an oscillating piston is the partition wall 30.

The tip end 30a of the partition wall 30 defines, between itself and the inside surface of an arch-shaped wall 29 of the liquid chamber 26, a little gap 26a for communication between the right liquid chamber 27 and the left liquid chamber 28. A non-compressible working liquid such as oil is sealed in the right liquid chamber 27 and the left liquid chamber 28, which are in communication with each other through the gap 26a and are mutually connected by a bypass passage 33.

Therefore, when the front wheel steering system is turned due to oscillational turning of the front wheel to the left or right direction and the partition wall 30 is turned (see imaginary lines in the FIG. 4) in conjunction with this, if the turning of the partition wall 30 is comparatively slow, the working liquid moves from the liquid chamber reduced in volume to the liquid chamber enlarged in volume on the opposite side through the gap 26a, thereby conforming to the change in volume. In this case, a small damping force is generated or only a slight damping force is generated at the gap 26a.

On the other hand, when the turning of the partition wall 30 is rapid, the amount of the working liquid to be moved exceeds the amount allowed to pass through the gap 26a, so that the working liquid moves from the liquid chamber reduced in volume to the liquid chamber on the other side through the bypass passage 33. The control valve 31 is provided at an intermediate portion of the bypass passage 33.

The control valve 31 includes a variable restriction passage for generating a damping force. Therefore, by varying the passage sectional area of the restriction passage, it is possible to restrict the working liquid movement of the working liquid attendant on the variation in volume between the left and right liquid chambers, thereby generating a variable damping force.

The control valve 31 in the present embodiment includes a first control valve 31a for regulating the damping force of the working liquid flowing from the right liquid chamber 27 toward the left liquid chamber 28, and a second control valve 31b for regulating the damping force of the working liquid flowing reversely from the left liquid chamber 28 toward the right liquid chamber 27. Here, a single control valve may be used in place of the first control valve 31a and the second control valve 31b which are separate members.

The bypass passage 33 also includes a first passage 33a passing through the first control valve 31a, and a second passage 33b passing through the second control valve 31b; a first flow rate sensor 37a is provided on the input side of the first control valve 31a in the first passage 33a, and a second flow rate sensor 37b is provided on the input side of the second control valve 31b in the second passage 33b. In addition, a stroke sensor 38 for detecting the turning amount of the partition wall 30 is provided in the steering damper 10.

These flow rate sensors 37a, 37b detect the rotating direction of the steering shaft 14, and also detect the flow rate and flow velocity. The stroke sensor 38 is for detecting the rotation amount of the steering shaft 14, and can be auxiliarily used also for calculating the steering speed of the steering shaft 14. The detection values of the sensors can be utilized as sensor quantities related to the magnitude of the kick-back. The detection results are outputted to the control unit 32 to be used for a damping force control as required.

Figure 5:
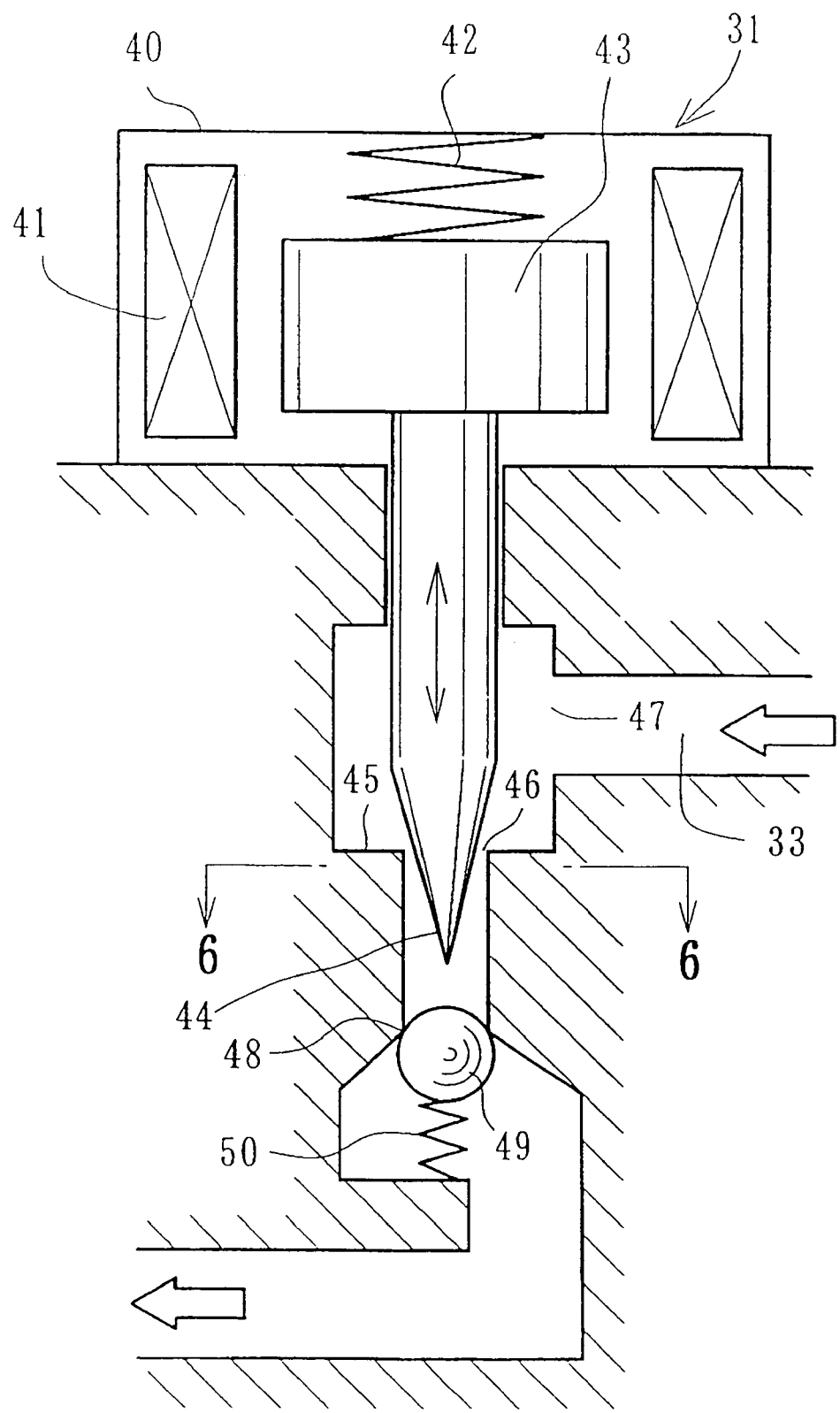
FIG. 5 is a sectional view of a solenoid valve.

FIG. 5 shows the structure of the control valve 31. Since the first control valve 31a and the second control valve 31b have the same structure, the control valves will be described as a common control valve 31 without discriminating one from the other. The control valve 31 has a structure in which a coil 41, a spring 42 and a plunger 43 are contained, in a case 40, and a roughly conically shaped needle portion 44, formed at one end of the plunger 43, advances and retracts in a restriction portion 45 in the vertical direction in the FIG. 5. The needle portion 44 has a thickness that gradually increases (or gradually decreases) along its axial direction. The restriction portion 45 is a portion for restricting a part of the passage sectional area of the bypass passage 33.

The control valve 31 is constituted as a linear solenoid comprising a driving portion which moves rectilinearly with a stroke proportional to the sensor quantity. The plunger 43 is moved downwardly in the FIG. 5 against the spring,42, according to an electromagnetic force by excitation of the coil 41, so as to vary the passage sectional area of the gap passage 46 formed between the inside wall of the restriction portion 45 and the periphery of the needle portion 44. Thus, the magnitude of the damping force generated by the working liquid passing through the gap passage 46 is varied. When the coil 41 is demagnetized, the plunger 43 is urged by the spring 42 to move upwardly in FIG. 5, whereby the restriction portion 45 is opened, resulting in no generation of a damping force.

Figure 6:
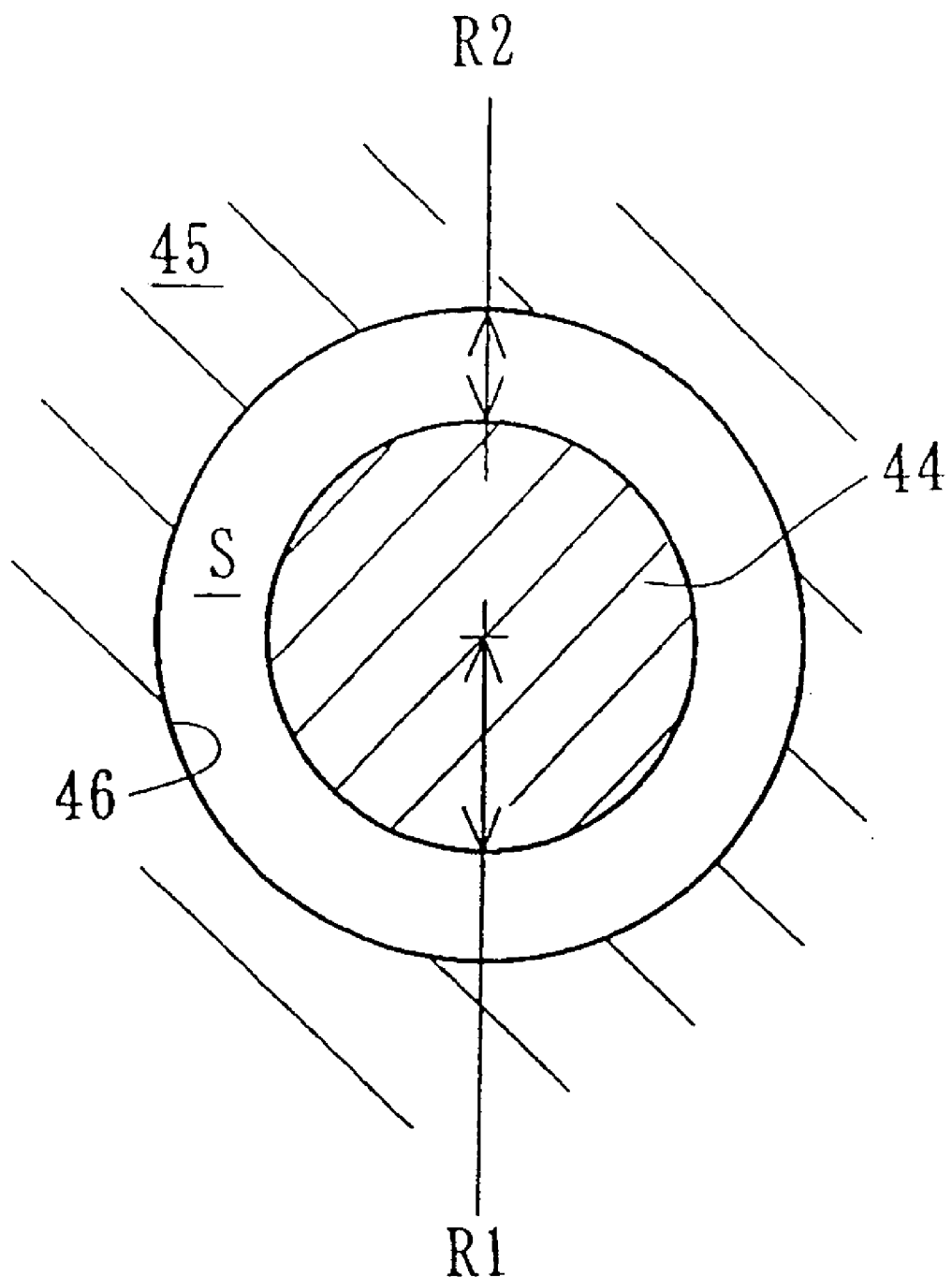
FIG. 6 is a sectional view taken along line 6—6 of FIG. 5.

As is clear from the cross-sections with respect to the axial directions of the needle portion 44 and the restriction portion 45 shown in FIG. 6, the sections of the needle portion 44 and the restriction portion 45 are circular, and the gap passage 46 formed therebetween is annular. Symbol R1 denotes the radius of the needle portion 44 at a certain section, R2 denotes the radius of the gap passage 46, and S denotes the clearance area corresponding to the passage sectional area of the gap passage 46, which show respective values in the same arbitrary section (in FIG. 6, the section corresponding to line 6—6 of FIG. 5).

The clearance area S is variable according to advancing/retracting motions of the plunger 43, and the radius R1 of the needle portion 44 in a certain section linearly varies proportionally to the stroke d at the time of advancing/retracting of the plunger 43. Attendant on this, the radius R2 of the gap passage 46 varies inversely proportionally to the radius R1, since the inside diameter of the restriction portion 45 is constant.

As a result, the clearance area S varies to vary the restriction amount of the bypass passage 33, thereby varying the generation of the damping force nonlinearly.

Again with respect to FIG. 5, an inlet 47 of the restriction portion 45 is provided together with an outlet 48. The outlet 48 is opened and closed by a check valve including a ball 49 and a check spring 50. The outlet 48 is closed when the liquid pressure at the outlet 48 is less than a predetermined value. The outlet 48 is opened when the liquid pressure is not less than the predetermined value, thereby allowing the working liquid to flow from the inlet 47 to the outlet 48. The check valve is provided in each of the first control valve 31a and the second control valve 31*b* (See FIG. 4), and the check valve provided on the side of the first control valve 31*a* permits the flow of the working liquid only from the right liquid chamber 27 to the side of the left liquid chamber 28 and prevents a reverse flow. The check valve on the side of the second control valve 31*b* functions in the reverse manner.

Figure 7:
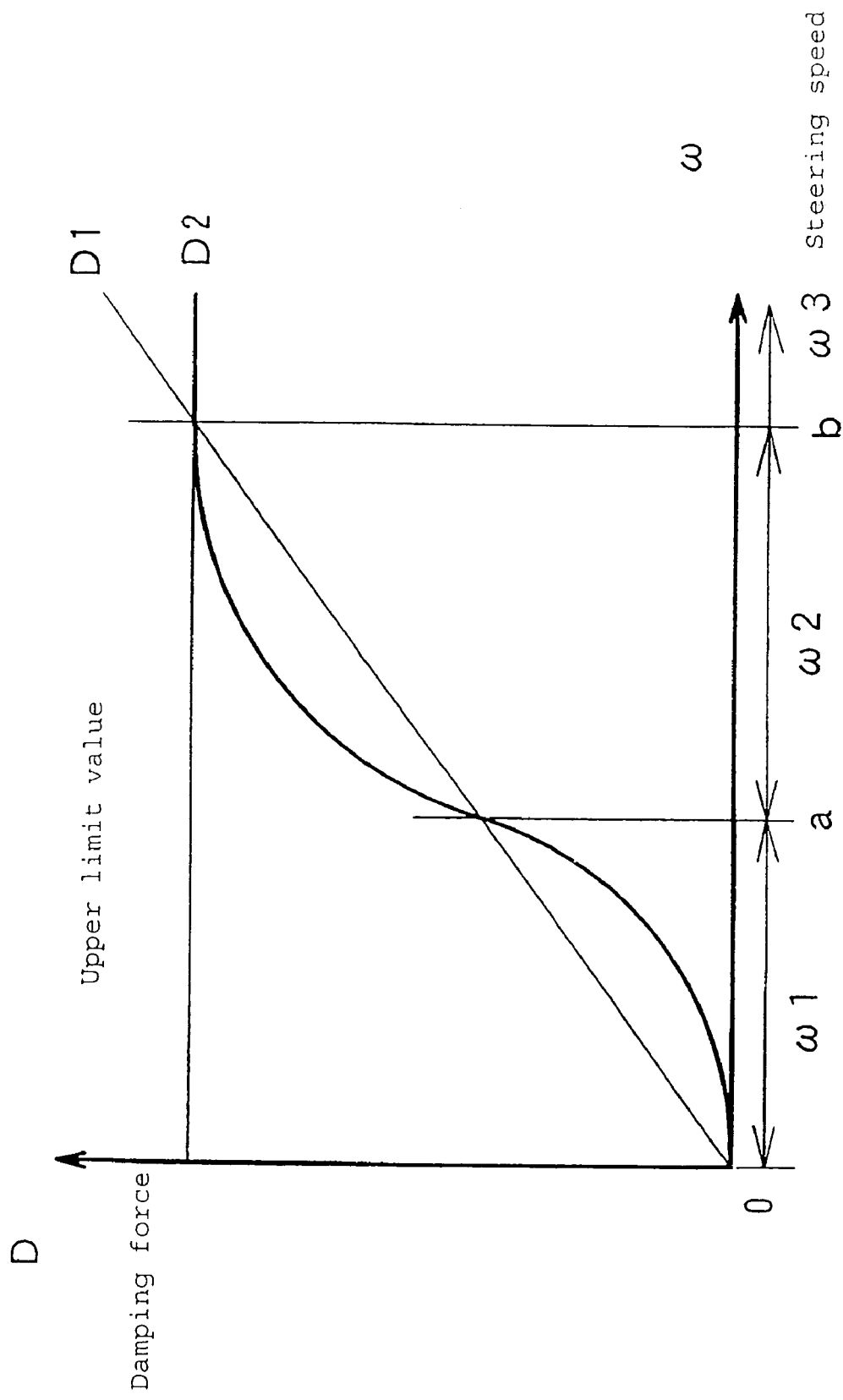
FIG. 7 is a graph showing actions based on steering speed.

FIG. 7 is a graph showing the contents of the control of the damping force by the control unit 32, in which the axis of abscissas represents the steering speed, the axis of ordinates represents the damping force, D1 denotes a reference line indicating the reference value, and D2 denotes a correction curve. The reference line D1 indicates the reference value, and shows that the damping force varies linearly in proportion to the magnitude of the steering speed. The reference line D1 is drawn so as to pass through the origin and a predetermined value a which will be described later.

In FIG. 7, $\omega 1$ is a rider operation region in which the damping force is set low for allowing smooth rider operations, while $\omega 2$ is a disturbance convergence region in which it is necessary to positively converge the disturbance by enhancing the damping force and $\omega 3$ is an upper limit restriction region in which the needlessly excess portion of the damping force is to be cut off.

The correction curve D2 shows correction with respect to the reference line D1. The correction curve D2 is regulated to be on the lower side of the reference line D1, namely, so that the damping force is smaller, in the rider operation region $\omega 1$ below a positive/negative inversion position a (the steering speed is at a boundary value between the rider operation region $\omega 1$ and the disturbance convergence region $\omega 2$). On the other hand, the correction curve D2 is regulated to be on the upper side of the reference line D1, namely, so that the damping force is greater than the reference value, in the disturbance convergence region $\omega 2$ above the positive/negative inversion position a.

In the upper limit restriction region $\omega 3$ exceeding a predetermined threshold value b, the damping force is substantially constant. In this case, where the generation of the damping force has reached a sufficient upper limit value and it is unnecessary to increase the generation of the damping force even if the steering speed $\omega$ increases further, a further increase in the damping force is restrained, and the damping force is maintained to be constant at roughly the same level.

Figure 8:
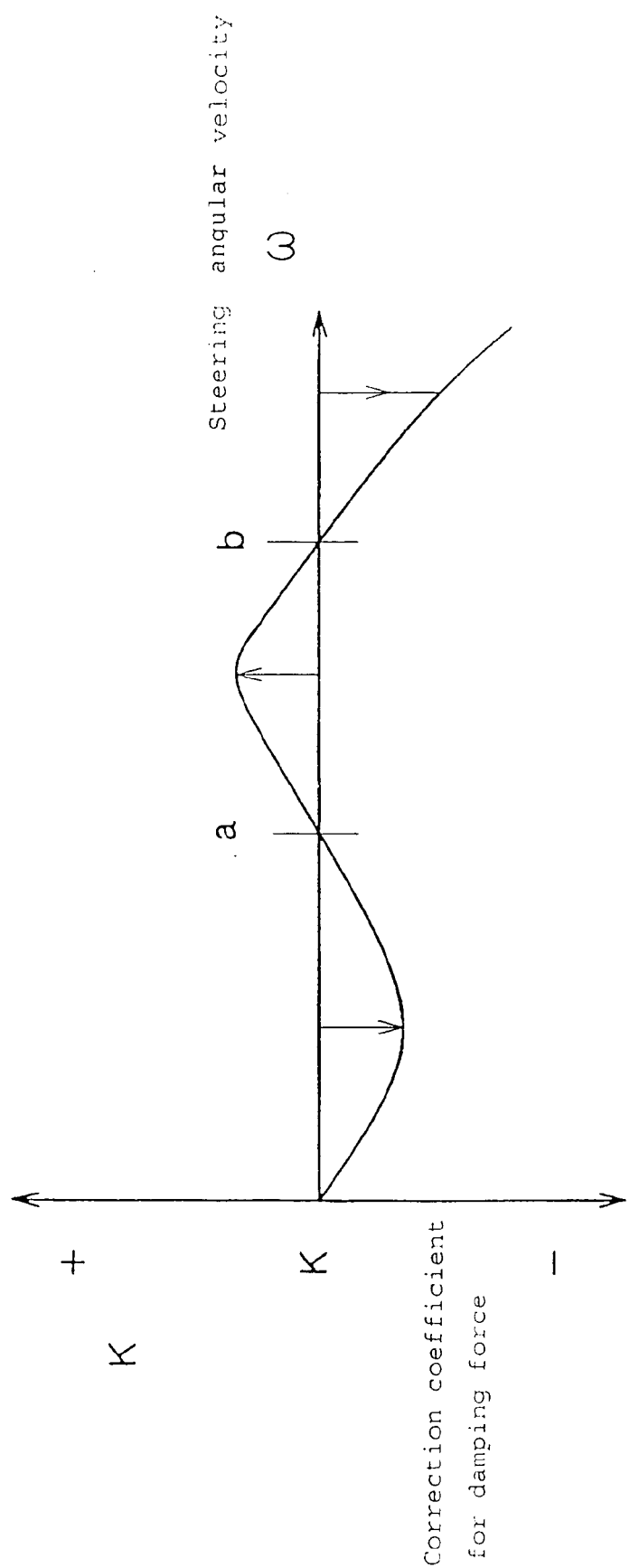
FIG. 8 is a graph showing the setting of a correction coefficient.

FIG. 8 is a graph showing the setting of a correction coefficient in such a correction, in which the axis of abscissas represents the steering speed $\omega$, and the axis of ordinates represents the correction coefficient K. In the graph, K=0 corresponds to the reference line D1; in the rider operation region $\omega 1$ where $\omega$ is in the range from the origin 0 to the positive/negative inversion position a, K varies along a quadric curve convex to the lower side so that K is negative; and in the disturbance convergence region $\omega 2$ in the range from the positive/negative inversion position a to the threshold value b, K varies along a quadric curve convex to the upper side so that K is positive. In the upper limit restriction region $\omega 3$ exceeding the threshold value b, K varies linearly with a rightwardly downward gradient to the negative side. In this case, K=0 may be maintained.

Next, actions of the present embodiment will be described. In FIG. 4, when the steering shaft is turned due to a disturbance, the shaft 23 integral with the steering shaft is turned. If the partition wall 30 is turned to the side of the left liquid chamber 28, the control unit 32 calculates the steering speed by differentiating the rotational angle detected by the rotational angle sensor 25, detects the rotating direction based on the detection results of the second flow rate sensor 37*b* and the stroke sensor 38, and, based on this data, gives to the second control valve 31*b* an instruction for restricting the second passage 33*b* by a predetermined amount corresponding to the steering speed. In the case where the partition wall 30 is turned in the reverse direction, also, an instruction for restriction is similarly given to the first control valve 31*a*.

This instruction is for causing the plunger 43 of the control valve 31 shown in FIG. 5 to advance or retract by the amount calculated by the control unit 32; the plunger 43 is lowered so as to restrict the gap passage 46 at the restriction portion 45. By this, the clearance area S of the gap passage 46 is varied to generate a required damping force, thereby inhibiting the turning of the partition wall 30, and a damping force is exerted on the turning of the shaft 23 and the steering shaft 14 which are integral with the partition wall 30, whereby the swing of the handle due to kick-back is damped.

At this time, the control of the damping force mentioned above is conducted along the correction curve D2 shown in FIG. 7, according to the steering speed. In the rider operation region $\omega 1$, the curve is on the lower side of the reference line D1, and the damping force is regulated to be small, so that the rider operations can be carried out as smooth as possible, and the priority can be given to a light handle operability by the rider. On the other hand, in the disturbance convergence region $\omega 2$, the correction amount is made to be positive so as to make the generation of the damping force greater than the reference value because the steering speed is high, whereby the damping force is regulated to be on the upper side of the reference line D1, namely, to be greater, so that the disturbance can be converged speedily and effectively.

In addition, since the reference value is corrected according to the magnitude of the steering speed which has a close relationship with the generation of a kick-back and with which the steering conditions of the front wheels steering system can be grasped appropriately, it is possible to generate an appropriate damping force according to the variation of the steering speed in actual operation, and to make the steerability more satisfactory in conformity with the actual operation. Besides, while it is considered that the steering angle in the front wheel steering system would become greater as the kick-back to be generated due to a disturbance is greater, it is possible to generate a required damping force before the actual steering angle becomes too large.

Incidentally, in the case of the illustrated example in which the working liquid flows from the left liquid chamber 28 towards the side of the right liquid chamber 27, of the two systems of the bypass passage 33 as shown in FIG. 4, only the second passage 33*b* on one side is restricted by the second control valve 31*b*, while the first passage 33*a* on the other side is not restricted because the first control valve 31*a* is in a valve open condition. Therefore, the flow of the working liquid from the right liquid chamber 27 to the side of the left liquid chamber 28 through the first passage 33*a* occurs smoothly. At this time, the check valve in the first control valve 31*a* also permits this flow. Accordingly, it is possible not only to inhibit the turning of the front wheel steering system due to kick-back but also to permit a swift turning for returning the handle to a straight forward position.

In addition, in FIG. 7, in the upper limit restriction region $\omega 3$ exceeding the threshold value b, an upper limit is given to the generation of the damping force so that a damping force greater than the upper limit necessary for prevention of kick-back would not be generated. Therefore, it is possible to prevent the generation of a damping force at a needlessly high level for prevention of kick-back, and to make appropriate the strength required for the steering damper 10. Accordingly, it is unnecessary to set a needlessly high strength for the steering damper 10, and it is possible to prevent the steering damper 10 from being broken due to an excessively high damping force.

It should be noted here that the upper limit restriction in the upper limit restriction region ω3 may not be based on the correction coefficient K but may be effected by the control valve 31. In this case, the maximum output of the electromagnetic force in the control valve 31 is set at about the reference value corresponding to the threshold value b, whereby it is ensured that the damping force would not exceed the reference value at the threshold value b even if the steering speed exceeds the threshold value b. Therefore, the upper limit restricting means can be constituted easily and inexpensively by simply adjusting the electromagnetic force.

In addition, the correction curve D2 shown in FIG. 7 can be easily realized by setting the correction coefficient so that K is negative in the rider operation region ω1, K is positive in the disturbance convergence region ω2, and K is negative in the upper limit restriction region ω3. Moreover, since K can be set arbitrarily, the contents of the correction can be regulated freely.

Incidentally, the present invention is not limited to the above embodiments, and various modifications and applications are possible within the principle of the invention. For example, the steering damper to which the present invention is applied is not limited to the vane type comprising the oscillating partition wall as in the embodiment, but may be a cylinder system comprising a piston which advances and retracts.

In addition, as far as the correction is based on the steering speed, the variable quantity as the basis for the control of the damping force may not necessarily be based on the steering speed, and may be any of various variable quantities related to the magnitude of kick-back, such as steering angle, those described in the abovementioned related art examples, and so on.

Further, the control valve 31 is not limited to the solenoid valve, and other known valves can be utilized.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A steering damper system of the liquid pressure in which a damping force is exerted on a front wheel steering system provided at a front portion of a vehicle body and which comprises:
    a control valve for making said damping force variable;
    said damping force is varied according to a variable quantity related to the magnitude of a kick-back forecasted in said front wheel steering system, and a reference value of said damping force varying linearly in proportion to said variable quantity is corrected according to the steering speed of said front wheel steering system.

2. The steering damper system as set forth in claim 1, wherein said variable quantity is said steering speed, a correction is conducted so that the correction amount becomes negative in relation to said reference value when said steering speed is low, and a correction is conducted so that the correction amount becomes positive in relation to said reference value when said steering speed is high.

3. The steering damper system as set forth in claim 1, wherein said damping force becomes constant when said steering speed has exceeded a predetermined threshold value.

4. The steering damper system as set forth in claim 1, wherein said control valve is a solenoid valve, and an upper limit restriction of said damping force is effected by an electromagnetic force of said solenoid valve.

5. The steering damper system as set forth in claim 1, wherein said steering damper includes a chamber with a vane disposed therein, said vane being moved in a first direction in relationship with a front wheel being moved in a first direction and said vane being moved in a second direction in relationship with a front wheel being moved in a second direction.

6. The steering damper system as set forth in claim 5, wherein said vane divides said chamber into a first section and a second section, a gap is provided between said vane and an inner wall of said chamber for providing communication of a fluid disposed within said chamber from either one of said first section to said second section and said second section to said first section.

7. The steering damper system as set forth in claim 6, wherein said steering damper system includes two control valves, a first control valve being operatively connected to said first section of said chamber and a second control valve being operatively connected to said second section of said chamber.

8. The steering damper system as set forth in claim 7, and further including a first flow rate sensor for sensing the flow of fluid from said first section of said chamber to said first control valve and a second flow rate sensor for sensing the flow of fluid from said second section of said chamber to said second control valve.

9. The steering damper system as set forth in claim 5, wherein said chamber is fan shaped.

10. The steering damper system as set forth in claim 1, and further including biasing means for normally biasing said valve body to an open position.

11. A steering damper system of the liquid pressure in which a damping force is exerted on a front wheel steering system provided at a front portion of a vehicle body and which comprises:
    a control valve for providing a variable damping force for controlling kick-back on the front wheel steering system;
    a variable quantity damping force being varied in accordance to a related magnitude of the kick-back forecasted in said front wheel steering system, and a reference value of said damping force varying linearly in proportion to said variable quantity is corrected according to the steering speed of said front wheel steering system.

12. The steering damper system as set forth in claim 11, wherein said control valve is a solenoid valve, and said upper limit restriction of said damping force is effected by an electromagnetic force of said solenoid valve.

13. The steering damper system as set forth in claim 11, wherein said steering damper includes a chamber with a vane disposed therein, said vane being moved in a first direction in relationship with a front wheel being moved in a first direction and said vane being moved in a second direction in relationship with a front wheel being moved in a second direction.

14. The steering damper system as set forth in claim 13, wherein said vane divides said chamber into a first section and a second section, a gap is provided between said vane and an inner wall of said chamber for providing communication of a fluid disposed within said chamber from either one of said first section to said second section and said second section to said first section.

15. The steering damper system as set forth in claim 14, wherein said steering damper system includes two control valves, a first control valve being operatively connected to said first section of said chamber and a second control valve being operatively connected to said second section of said chamber.

16. The steering damper system as set forth in claim 15, and further including a first flow rate sensor for sensing the flow of fluid from said first section of said chamber to said first control valve and a second flow rate sensor for sensing the flow of fluid from said second section of said chamber to said second control valve.

17. The steering damper system as set forth in claim 13, wherein said chamber is fan shaped.

18. The steering damper system as set forth in claim 11, and further including biasing means for normally biasing said valve body to an open position.

19. The steering damper system as set forth in claim 11, wherein said variable quantity is said steering speed, a correction is conducted so that the correction amount becomes negative in relation to said reference value when said steering speed is low, and a correction is conducted so that the correction amount becomes positive in relation to said reference value when said steering speed is high.

20. The steering damper system as set forth in claim 11, wherein said damping force becomes constant when said steering speed has exceeded a predetermined threshold value.

* * * * *